United States Patent [19]

Donegan

[11] 4,040,756
[45] Aug. 9, 1977

[54] DRILL ROD THREAD FORM

[75] Inventor: Edward Alfred Donegan, St. Catharines, Canada

[73] Assignee: TRW Canada Limited, Canada

[21] Appl. No.: 664,259

[22] Filed: Mar. 5, 1976

[51] Int. Cl.² .............................................. F16B 7/00
[52] U.S. Cl. .................................. 403/307; 403/343; 285/390; 85/46
[58] Field of Search ...................... 403/307, 343, 296; 285/334, 390, 355; 85/46

[56] References Cited

U.S. PATENT DOCUMENTS

| | | | |
|---|---|---|---|
| 3,129,963 | 4/1964 | Robbins | 285/334 |
| 3,355,192 | 11/1967 | Kloesel, Jr. et al. | 285/334 X |
| 3,359,013 | 12/1967 | Knox et al. | 285/334 X |
| 3,388,935 | 6/1968 | Hjalsten et al. | 403/343 |
| 3,508,771 | 4/1970 | Duret | 285/334 |
| 3,574,373 | 4/1971 | LeDerf et al. | 403/307 X |
| 3,645,570 | 2/1972 | Johansson et al. | 403/307 |

FOREIGN PATENT DOCUMENTS 1,061,458  7/1959  Germany ............................ 403/343

Primary Examiner—Andrew V. Kundrat

[57] ABSTRACT

A thread structure for use in coupling percussion drilling extension rods minimizes the torque necessary to disconnect such extension rods. This is accomplished by beveling the crest portions of the cooperating thread structures. The direction of the bevel is such that the greatest intrusion of the crest portions into the complementary portions of the cooperating thread structure occurs immediately adjacent the abutting flanks thereof. The abutting flanks then wear in such a way that wedging is substantially avoided. Additionally, the root portions are defined by a continuously curved surface that smoothly extends into a flat surface defining the thread flanks so that fatigue stresses are minimized.

4 Claims, 3 Drawing Figures

DRILL ROD THREAD FORM

Background - Summary of the Invention

The present invention relates to the art of thread forms, and more particularly to a thread structure for use on percussion drilling parts, such as extension rods, and coupling sleeves for connecting extension rods.

Percussion drilling operations ordinarily employ a number of longitudinal extension drill rods joined at their ends by coupling sleeves. These extension drill rods characteristically have external thread structures which cooperate with the internal thread structures of the coupling sleeves to provide a connection therebetween. These thread forms will be referred to herein as having top crest portions and flank portions, the lower ends of which flanks are interconnected by root portions.

One problem arising with known thread forms used for percussion drilling parts is that the threads thereof are tightened due to the percussive rotary forces being transmitted during the drilling operation. This, of course, results in a corresponding increase in the torque necessary to uncouple the parts. It has been found that this increase in required uncoupling torque is due to wedging between the cooperating thread structures. In a relatively new or unworn thread, the wedging problem is attributable to the binding between the flank portions of one thread structure and the complementary portions of the cooperating thread structure. In a used or worn thread, the wedging problem is due to binding between the flank and crest portions of the thread structure and the complementary structures.

U.S. Pat. No. 3,645,570 to Johansson et al exemplifies prior art attempts to resolve this problem. The thread structure disclosed therein is profiled in such a way that, upon proper engagement of the cooperating thread structures, the crest and root portions of the respective thread structures do not contact one another. More specifically, Johansson discloses a thread design having abutting flanks which are inclined at 25° to 40° and preferably 35° to the drill rod axis. The crest and root portions are substantially straight and parallel to the drill rod axis and are radially spaced from the complementary portions of the cooperating thread structure. So designed, the possibility of wedging between portions of one thread structure with the root portions of the cooperating thread structure is reduced.

Such thread designs do not, however, cope with the effect of wedging after substantial wear of the thread structure has occurred. In percussion drilling, the threads are subject to both rotary and percussive forces. These percussive forces, which are transmitted by the abutting flanks, cause substantial wear thereof. As the abutting flanks are eroded, the thread structure remaining has a portion which is in effect an extension of the root portion and is substantially parallel to the drill rod axis. Since the crest portion of the cooperating thread abuts this worn extension of the root portion of the eroded flank, wedging develops.

Another common problem occurring during the use of percussion drill rods is that the threads tend to break due to fatigue stresses. It has been found that these stresses generally occur where there is a sharp change in diameter of the rod.

The present invention provides a thread structure featuring low uncoupling torque characteristics which are maintained during the life of the thread. Further, a thread structure in accordance with the present invention minimizes fatigue stresses during use.

The present invention more specifically provides percussion drill rod extensions and couplings with threads having crest portions which are slightly inclined to the drill rod axis. the crest portions are angled away from the abutting flank portions toward the root portions whereby the maximum radial dimension occurs immediately adjacent the abutting flank portion. This avoids extensive contact between the crest portions of the thread and the complementary portion of the cooperating thread structure, even after the abutting flank has been significantly eroded. Thus, uncoupling torque is minimized.

In accordance with another aspect of the present invention, a thread structure is provided which reduces fatigue stress concentration by providing continuously curved root portions. Specifically, the curvature of the root portions meets each of the flank portions on opposite sides of the root portion tangentially.

BRIEF DESCRIPTION OF THE DRAWINGS

The foregoing and other aspects and advantages of the present invention will become more readily apparent to those skilled in the art from the following detailed description as taken in conjunction with the accompanying drawings which are a part hereof and wherein.

DETAILED DESCRIPTION OF A PREFERRED EMBODIMENT

Figure 1:
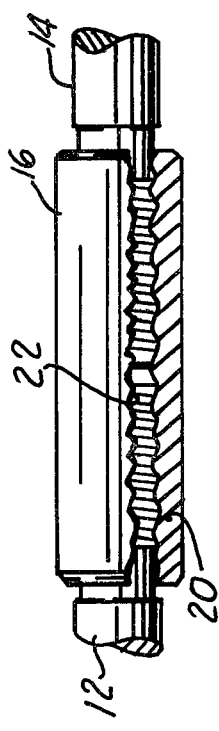
FIG. 1 is an illustration of a drill rod coupling partly in elevation and partly in section.

Referring first to FIG. 1, percussion drill rod extensions 12 and 14 are interconnected by a coupling sleeve 16. The drill rod extensions 12 and 14 have external threads 20 which cooperate with internal threads 22 formed on sleeve 16 to provide a rigid connection therebetween.

Figure 2:
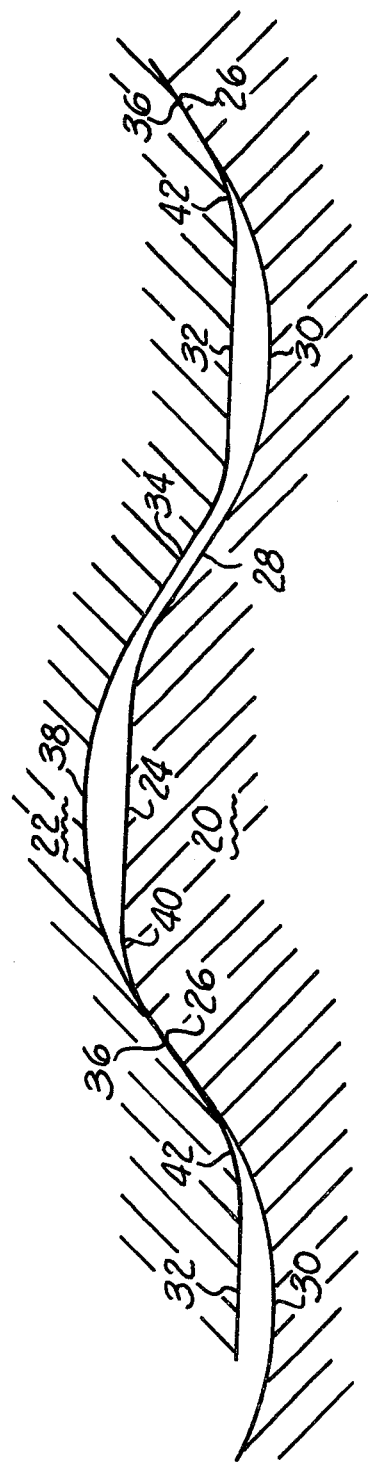
FIG. 2 is a longitudinal sectional view of two cooperating thread structures according to this invention prior to erosion of the abutting flanks.
Figure 3:
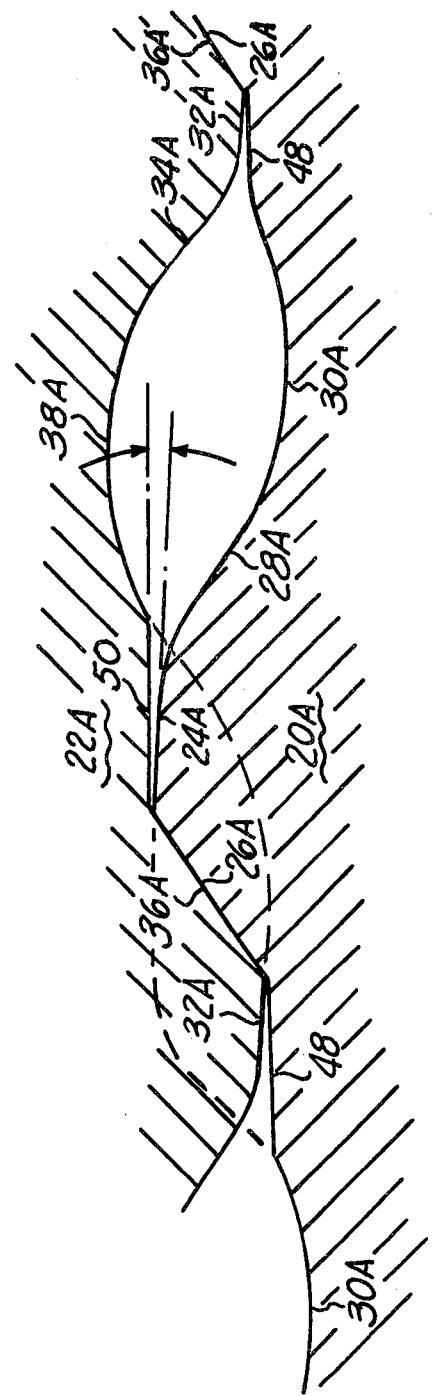
FIG. 3 is a longitudinal sectional view of two cooperating thread structures according to the invention after substantial erosion of the abutting flanks has occurred.

FIGS. 2 and 3 illustrate the cooperating thread structures in enlarged longitudinal profile. Rod thread 20 has a crest portion 24 embraced on either side by flank portions 26 and 28. Root portion 30 serves to interconnect the lower flank portions of adjacent threads. In a similar manner, sleeve thread 22 has crest portions 32 embraced on either side by flanks 34 and 36, adjacent threads being connected by root portion 38.

Contact between the two thread structures occurs at flanks 26 and 36, referred to hereinafter as the abutting flanks. Flanks 34 and 28 are not abutting but rather spaced apart. Since the abutting flanks are load-bearing surfaces, they are preferably mated to provide the largest possible area of contact. This can be conveniently accomplished by structuring at least a portion of flanks 26, 36 rectilinearly. Also, in accordance with known practice, the abutting flanks are inclined at an angle of 25° to 40°, and most preferably 35° to the drill rod extension axis. The nonabutting flanks are inclined at an angle of 25° to 40° and preferably 35° to the axis of coupling sleeve 16.

Also, crest portion 24 of rod thread 20 is radially spaced from the complementary root portion 38 of the cooperating sleeve thread 22 so as to substantially eliminate contact therebetween. Also, crest portion 32 is radially spaced from root portion 30.

According to the invention, crest portion 24 is substantially flat and is inclined at a slight angle with respect to the drill rod axis. This inclination is directed away from flank portion 26 which abuts flank 36 and inwardly toward the axis of the extension rod, so as to provide a peak crest portion 40 immediately adjacent to abutting flank protion 26. In a similar manner, crest portion 32 of sleeve thread 22 is inclined inwardly toward the axis of the coupling sleeve 16 as it extends away from flank 36 to provide a peak crest portion 42 immediately adjacent abutting flank portion 36.

Referring now to FIG. 3, the thread structure of FIG. 2 is there shown after substantial wear has occurred. Abutting flank portions 26 and 36 have significantly eroded to where flank surfaces 26A and 36A are in contact. Further, surfaces 48 and 50, which may be termed root extensions, have been formed due to the wear. It will be understood that separation between the newly exposed root extension 50 and the remaining crest portion 24A is provided due to the inclination of crest portion 24 with respect to the drill rod axis. It crest portion 24 were substantially parallel to a drill rod axis, root extension 50 would be similarly parallel to the drill rod axis, thus causing wedging to develop between the surface 50 and crest portion 24. On the other hand, with the crest portion inclined as set forth hereinbefore, it is apparent the root extension 50 and crest portion 24A do not have substantial contact, since portion 24A is inclined at a slight angle to the drill rod extension axis and, in fact, portion 24A and surface 50 diverge from one another as they extend from the abutting flank portions 26A and 36A. Due to this divergence, wedging is substantially precluded and uncoupling torque is minimized. Obviously, this is also precisely what occurs due to the inclne of crest portion 32 and thus root extension 48 and crest portion 32A do not have substantial contact, even though wear occurs.

It will be understood that it is the existence and direction of inclination rather than the extent thereof which secure the advantages of the present invention. Thus, the angle of inclination is not critical so long as it is adequate to prevent binding between the newly exposed root extensions and the remainder of the crest portions. It will be noted, however, that the greater the angle of inclination, the more rapidly the abutting flank portions 26 and 36 may wear. Thus, the angle of inclination is preferably quite small to provide the most advantageous wear characteristics. Therefore, in accordance with the preferred practice of the present invention, the angle of inclination is approximately 3°. Additionally, it will be understood that the crest portion need not be linear to practice the present invention; the crest portion could be any curvilinear shape having a generally decreasing radial dimension with increasing distance from the abutting flanks.

Referring once again to FIG. 2, in the present thread form local stress concentrations are reduced and fatigue life improved by providing continuously curved root portions. Thus, root portion 30 of rod thread 20 has a continuously curved shape and meets flank portions 26 and 28 tangentially. Similarly, root portion 38 of sleeve thread 22 meets flank portions 34 and 36 tangentially. To further reduce local stress concentrations, crest portions 24 and 32 can be structured so as to meet their respective flank portions along smoothly curved intermediate sections. Finally, since nonabutting flanks 28, 34 are generally not load-bearing surfaces, they may also be continuously curved to provide even distribution of stress.

From the above description, it should be clearly understood that this invention provides a percussion drill thread structure having crest portions inclined at a slight angle to the drill rod axis to prevent wedging after substantial wear, and also provides continuously curved root portions to thereby increase fatigue life.

Although the invention has been described with reference to the connection of two drill extensions, connection with drill bits and other drill rod members could be made as well. Also, although the invention has been described and illustrated with respect to a preferred embodiment, it will be understood that various modifications and alterations may be made without departing from the spirit and scope of the invention as defined in the following claims.

The embodiments of the invention in which an exclusive property or privilege is claimed are defined as follows:

1. Apparatus for use in percussion drilling for transmitting rotary and downwardly directed percussive forces to a drill bit, said apparatus comprising a first part and a second part, said first part having a cylindrical internal thread structure which cooperates with a cylindrical external thread structure on said second part, said thread structures on said first part and said second part being formed about a thread axis and constructed to minimize unlocking torque, the threads on said parts each having first and second axially spaced flanks, said first flanks each having a linear portion, said threads on each of said parts also having a crest portion extending between the outer edges of said first and second flanks and a root portion for interconnecting adjacent threads, said root portions of at least said second part being continuously curved and tangentially joined to the flank portions adjacent therewith such that local stress concentration is reduced, the crest portions of said threads being radially spaced from the root portion of the cooperating threads, said linear portions on said first flanks on one of said parts abutting said linear portions on said first flanks on the other of said parts, said first flanks being axially spaced from said second flanks to provide a thread of a thickness to accommodate substantial erosion of said first flanks by rotary and percussive forces during percussion drilling, said second flanks on said one part being spaced from said second flanks on the other of said parts, said first flanks being inclined at an angle of between 25° and 40° to the thread axis, and the crest portion of the threads of both said first and second parts being angled away from the abutting first flank portion of that thread toward the root portion of that thread to form a peak portion of the crest adjacent the abutting first flank portion such that after substantial wear of the abutting flank the crest portion of that thread remains out of substantial contact with the cooperating thread.

2. Apparatus as defined in claim 1, wherein said root portions of said first part are continuously curved and tangentially joined to the flank portions adjacent therewith such that local stress concentration is further reduced, and said crest portions of said first part adjoin said first and second flank portions along intermediate portions being continuously curved and joining said crest and flank portions tangentially to thereby further reduce said local stress concentration.

3. Apparatus as defined in claim 1 wherein the angle of inclination of said crest portion with respect to said thread axis is substantially 3°.

4. Apparatus as defined in claim 3 wherein said crest portions of at least said second part adjoin said first and second flank portions along intermediate portions being continuously curved and joining said crest and flank portions tangentially to thereby further reduce said local stress concentration.

* * * * *